US009419441B2

(12) United States Patent
Carrillo

(10) Patent No.: US 9,419,441 B2
(45) Date of Patent: Aug. 16, 2016

(54) METHOD OF BALANCING AN ELECTRICAL NETWORK COMPRISING SEVERAL GENERATORS, DISTRIBUTORS AND INSTALLATIONS

(75) Inventor: Jean-Jacques Carrillo, Montauban (FR)

(73) Assignees: NOVATEC, Montauban (FR); Jean-Jacques Carrillo, Montauban (FR); Stéphane Michel, Beauzelle (FR)

( * ) Notice: Subject to any disclaimer, the term of this patent is extended or adjusted under 35 U.S.C. 154(b) by 933 days.

(21) Appl. No.: 13/640,366

(22) PCT Filed: Apr. 12, 2011

(86) PCT No.: PCT/EP2011/055736
§ 371 (c)(1),
(2), (4) Date: Apr. 15, 2013

(87) PCT Pub. No.: WO2011/128344
PCT Pub. Date: Oct. 20, 2011

(65) Prior Publication Data
US 2013/0187455 A1 Jul. 25, 2013

(30) Foreign Application Priority Data

Apr. 12, 2010 (FR) ...................... 10 52750

(51) Int. Cl.
*H02J 4/00* (2006.01)
*H02J 3/00* (2006.01)
*H02J 13/00* (2006.01)

(52) U.S. Cl.
CPC . *H02J 4/00* (2013.01); *H02J 3/005* (2013.01); *H02J 3/006* (2013.01); *H02J 13/00* (2013.01); *Y10T 307/352* (2015.04)

(58) Field of Classification Search
CPC ............. H02J 4/00; H02J 3/005; H02J 3/006; H02J 13/00; Y10T 307/352
See application file for complete search history.

(56) References Cited

U.S. PATENT DOCUMENTS

| 7,110,865 | B2* | 9/2006 | Althaus | H02J 15/006 307/126 |
| 7,576,449 | B2* | 8/2009 | Becker | H02J 3/383 307/44 |
| 8,612,027 | B2* | 12/2013 | Carrillo | H03K 17/082 361/65 |
| 2007/0141999 | A1* | 6/2007 | Przywecki | B60R 16/03 455/82 |
| 2008/0157540 | A1* | 7/2008 | Fattal | B60L 11/123 290/40 R |

FOREIGN PATENT DOCUMENTS

| WO | 2007/113312 | 10/2007 |
| WO | 2009/125007 | 10/2009 |
| WO | 2010/037934 | 4/2010 |

OTHER PUBLICATIONS

International Search Report dated Jun. 26, 2012, corresponding to PCT/EP2011/055736.

\* cited by examiner

*Primary Examiner* — Zeev V Kitov
(74) *Attorney, Agent, or Firm* — Young & Thompson

(57) ABSTRACT

A method of balancing an electrical distribution system including several generators implements a network divided into several subnetworks powered by ring-like swappers. The balancing of the network between the various generators available is obtained through switchings of subnetworks selected as a function of the order of switching of the swappers.

10 Claims, 2 Drawing Sheets

Figure 1A:
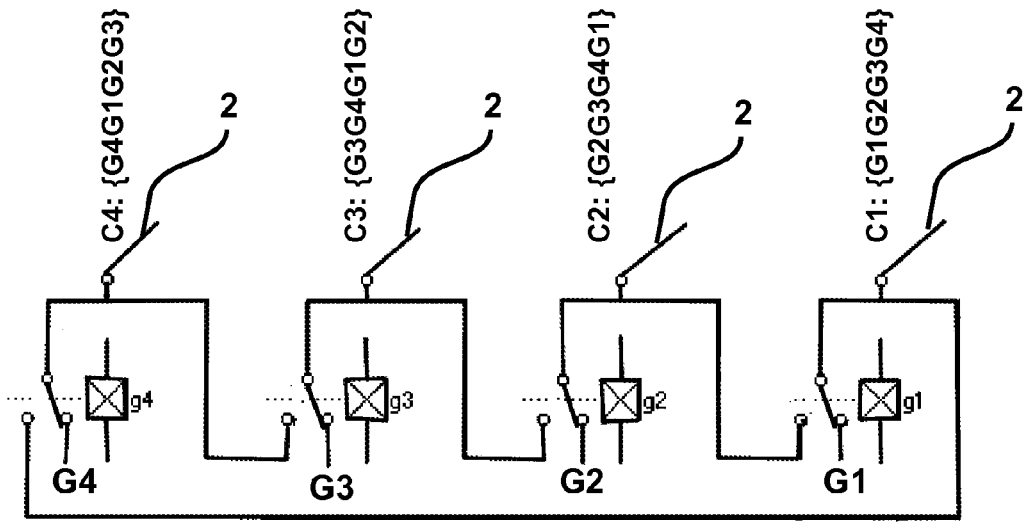

METHOD OF BALANCING AN ELECTRICAL NETWORK COMPRISING SEVERAL GENERATORS, DISTRIBUTORS AND INSTALLATIONS

TECHNICAL FIELD

This invention pertains to the field of processes and means used for the power supply of electrical loads by a network comprising several generators used as an electric power source.

More particularly, the invention relates to a process for distributing electrical loads onto different generators, in particular in confined environments that require a strict management of power resources.

It constitutes an improvement to the invention described in the French patent application 08/05435 for means for distributing generators.

In the following description, a generator is defined as an electric power source, thus one phase of a single-phase or multiphase electric source is comparable in what follows to a generator.

STATE OF THE PRIOR ART

Conventionally, electric networks are organized in a tree structure so that each electrical load is connected to an electric power source by electrical conductors arranged in series, between the electric power source and the electrical load.

To ensure the supply of several electrical loads by the same source, a star arrangement makes it possible to connect the loads to distributing bus-bars that can themselves be connected to other distributing bus-bars that are connected to the source.

At different levels, switching means, relays, static or non-static switches make it possible to isolate a load or a group of loads, even a bus-bar, from the generator, which makes it possible to cut off the source to which the loads are connected and to isolate these loads from the source.

For safety reasons, the electric power sources are most often redundant, just like the electric network, for supplying the loads.

In this case, when a load is considered critical, i.e., when its electric power supply must be maintained in case of malfunctioning of its normal electric power supply, either by failure of the source or by failure of the network, it is customary that this critical load be connected to a second network and/or to a second source.

For this purpose, the load, if necessary a part of the network supplying this load, and the malfunctioning source are isolated by switching means and connected to the other source.

Generally, when a source is malfunctioning, the most practical solution consists in switching the supply of a bus-bar from one source to another to continue to supply the loads connected to this supply bus-bar, which requires duplicating the means of the electric power supply system, a detrimental solution particularly in terms of costs and bulk.

DISCLOSURE OF THE INVENTION

The process for balancing an electrical distribution system according to the invention uses an electric network, divided into sub-networks, N generators, N greater than or equal to three, each generator supplying a part of the network when said generator is available, in which network each sub-network is supplied at a given moment by only one generator.

Each sub-network is associated, by a ring permutator to which it is connected, with a combination of P generators that define an order of connection, among the possible connections, of said sub-network to at least three, P being greater than or equal to three, of the generators among the N generators.

According to the balancing process:
in a first step are determined:
Wmaxnetwork: the maximum power available on the network, equal to the sum of the maximum powers WmaxGi that can be delivered by each of the operational generators Gi;
for each operational generator Gi the actual power delivered WGi;
in a second step are calculated for each of the operational generators, on the one hand, a new theoretical power for balancing WneGi that takes into account the desired conditions for distribution of the loads and such that sum (WneGi)=sum (WGi) of the operational generators Gi and, on the other hand, a power variance DWi=WGi–WneGi between the actual power and the new theoretical power for balancing;
in a third step are identified the sub-networks supplied by generators in positive imbalance, i.e., whose power variance DWi is positive, and that can be reassigned by a switching of a ring permutator to a generator in negative imbalance, i.e., whose power variance DWi is negative;
in a fourth step, ring permutators connected to the sub-networks identified during the preceding step are actuated to supply all or part of said sub-networks by generators in negative imbalance.

The process thus used by one unit of calculations and command thus makes it possible to achieve a dynamic balancing while taking advantage of the ring permutators and while ensuring electrical distribution in the sub-networks.

In preferred or advantageous forms of use, during the third step identified among the ring permutators are:
those of a first category that comprise an operational generator in negative imbalance and declared unavailable in the ring permutator;
those of a second category that comprise a generator in positive imbalance and effectively supplying a sub-network that is effectively followed in the permutation order of their combinations by a generator in negative imbalance.

Advantageously, during the fourth step, the balancing of the network is achieved firstly by action on the ring permutators of the first category.

Other details of embodiment improving the effectiveness of the process consist in:
performing the third and fourth steps only when at least a power variance DWi exceeds a threshold value;
and/or performing the third and fourth steps only if a predetermined time has passed since a prior execution of said third and fourth steps.

The switching is done, for example, by action on mechanical or electromechanical or static permutators laid out in a ring or else by actuations on switches by means of an actuating logic that functionally reproduces the ring switchings.

In the case of a network whose loads are supplied by circuit breakers in stages, such as the circuit breakers described in the French patent application 08/05433, the functional reproduction of the ring switchings can, if necessary, be performed by an implementation adapted to circuit breakers in stages.

Apart from any rebalancing, each sub-network is assigned by default to a given generator so that there is no orphan sub-network, i.e., a network that is not assigned to a sub-network.

The actual power outputs of the generators can be known by measurements or determined by the knowledge of the loads connected to the sub-networks.

The electrical distribution system used within the framework of the process of the invention advantageously comprises:
- ring permutators with all of the N generators of the distribution system under consideration, and/or
- ring permutators representing all the possible combinations in the permutation order of the generators, i.e., N factorial, and/or
- two or more permutators corresponding to the same combination in the permutation order, the number of sub-networks then being able to be greater than N factorial.

In a preferred form of application, the process is used with an electrical distribution system of an autonomous engine in its production of power such as a land, sea, air or space vehicle.

SUMMARY DESCRIPTION OF THE FIGURES

Figure 1B:
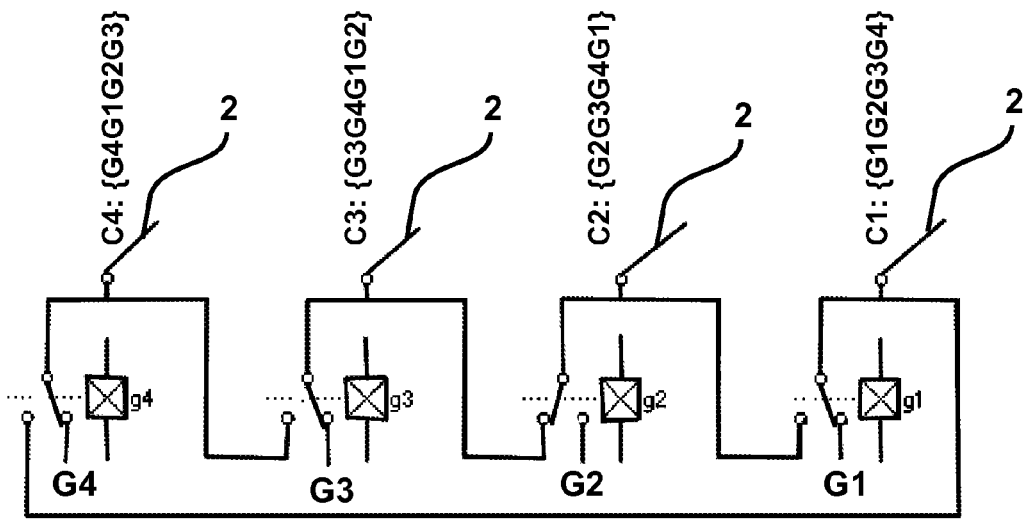
Figure 2:
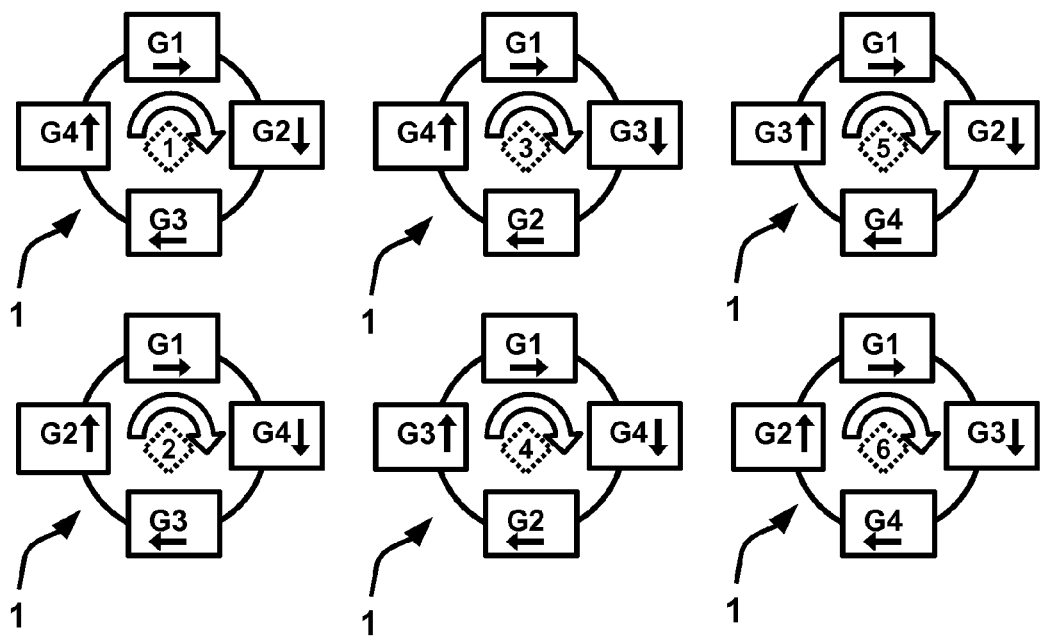
Figure 3:
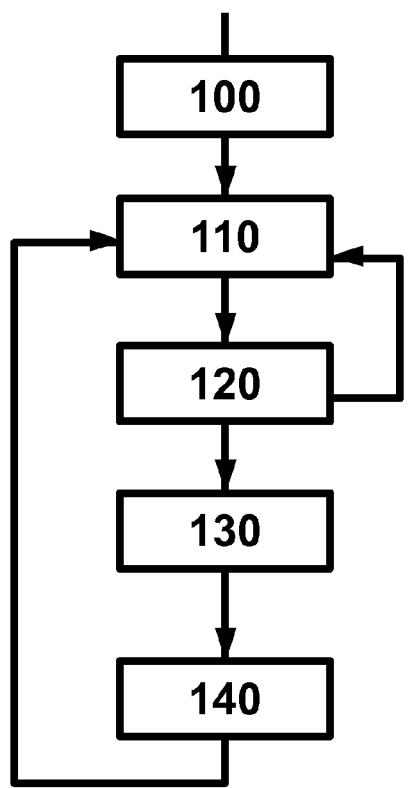

Other advantages and characteristics of the invention will come out from reading the description of a preferred embodiment given by way of nonlimiting example with reference to the accompanying drawings in which:

FIG. 1a diagrammatically shows a ring permutator in nominal conditions;

FIG. 1b shows the ring permutator of FIG. 1a in which a generator (G2) is declared unavailable;

FIG. 2 symbolically shows the six ring permutators of an electrical distribution system with four generators; and FIG. 3 shows a synoptic view of the process.

DETAILED DESCRIPTION OF AN EMBODIMENT OF THE INVENTION

The process for balancing an electric network that is the object of this invention uses an electrical distribution system comprising N electric power sources, designated generators, N being the number of generators of the network under consideration, intended to supply electric power consumer elements, designated loads, and electrical conductors, between the generators and the loads, forming a network, said network being divided into sub-networks.

In the invention, the electrical distribution system comprises at least three generators, i.e., N is greater than or equal to three.

Each sub-network supplies a load, or a group of loads, here then considered as a load, and is supplied at a given moment by a single generator.

The number of sub-networks is in practice adapted to the numbers of loads that must be supplied, to the manner in which certain loads can be grouped, to their locations in a confined environment, to the segregations and redundancies that must be ensured . . . .

In a complex system, the number of sub-networks can therefore be large and most often will be much greater than the number of generators.

Furthermore, each indicator sub-network(s) is in a position to be supplied by P generators G(j), with j equals 1 to P, among the N generators of the distribution system, with P at least equal to three.

Each indicator sub-network(s) is also associated with a combination C(t) of P generators G(j) by which it is in a position to be supplied, combination C(t) corresponding to an order of cyclic permutation in a ring association of said P generators in such a way that the sub-network is supplied by the first available generator in the permutation order of the combination associated with said sub-network.

The device that ensures these cyclic permutations is called a ring permutator. It can be accomplished by different means using switches that can be actuated by mechanical or electro-mechanical means or by static switching means arranged in parallel and activated by a command unit that receives control signals, coming from detectors or sensors, representing the state of the generators as well as of the ring permutators.

A generator in a state of delivering an expected power within the framework of the operation of the system is called an operational generator.

The operational status of a generator is therefore inherent to the generator itself, a broken-down generator no longer being operational.

In a practical case illustrated in FIG. 2, which will be used as an example of embodiment for the detailed description, it will be considered that the distribution system uses four generators G1, G2, G3, G4, that is to say that N=4, and that each sub-network will be in a position to be supplied by said four generators, that is to say P=N=4.

The factorial is thus defined as four possible permutation combinations, or 24 orders of permutation, and to illustrate the use of the process, it will also be considered that the network comprises at least one associated sub-network, each of these combinations C(t) with t=1 to 24.

Advantageously, the combinations corresponding to an identical permutation order are grouped together into the same ring permutator 1. On the same ring permutator 1, the permutation orders of the generators of one combination are distinguished by the first generator considered in the combination under consideration.

As illustrated in FIG. 2, there are therefore six ring permutators 1 in the case of the illustrated system comprising four generators and 24 combinations.

For example, the first ring permutator, whose rank is indicated by the number in the center of the circle symbolizing the ring, of FIG. 2, corresponds to the following combinations of the four generators G1, G2, G3 and G4:

$$C(1)=\{G1-G2-G3-G4\}$$

$$C(2)=\{G2-G3-G4-G1\}$$

$$C(3)=\{G3-G4-G1-G2\}$$

$$C(4)=\{G4-G1-G2-G3\}$$

Such a means for distributing generators is also described in the French patent application 08/05435 that has as its inventor the inventor of this application and that was filed on Oct. 1, 2010 for a method for organizing an electric network comprising multiple generators, distributors, and installations.

FIGS. 1a and 1b diagrammatically offer an example of embodiment of a ring permutator with 4 generators.

This example corresponds to the first ring permutator of FIG. 2 presented above. It is found in FIG. 1a, in a nominal configuration, that each sub-network 2 is supplied by a different generator, respectively G1, G2, G3 and G4 because of the position of switches g1, g2, g3, and g4 associated with each generator respectively.

In FIG. 1b, by way of illustration, the generator G2 is declared unavailable in the ring permutator under consideration by control means, not shown and which control the position of the switches g1, g2, g3, and g4, which results in the sub-network initially supplied by G2 being supplied by the generator following it in the combination associated with said sub-network, i.e., here the generator G3 as a result of the change in state of the switch g2.

A generator can be declared unavailable in the ring permutator under consideration even if this generator is operational, that is to say that it is then comparable to a non-operational generator for this permutator without necessarily being so for the other ring permutators of the system.

In this case, the ring permutator is switched so that the generator declared unavailable no longer supplies any of the sub-networks supplied by the ring permutator, the case of the generator G2 in FIG. 1b.

The "available" or "unavailable" nature is therefore an arbitrary characteristic of a pair {generator, ring permutator}.

To balance the network, when all of the generators Gi are operational and the loads desired in nominal conditions are supplied, the sub-networks are assigned to the different generators to obtain an optimal distribution of the loads between the different generators, that is to say that the sub-networks are distributed on the different ring permutators and between the different generators so as to obtain for each generator an actual total power as close as possible to a theoretical total balancing power WteGi.

Obviously, it should be understood that the theoretical balancing powers WteGi assigned to each generator Gi are not necessarily identical.

In particular, if the generators are not of the same maximum nominal power, the distribution of theoretical balancing powers can be considered as that which leads to an identical relative load (by % of the maximum nominal load) for each generator.

The theoretical balancing powers WteGi can also differ in absolute value or in relative value, for example, to ensure a different aging between the different generators of a distribution system for reasons of the safety of the distribution system.

In the example illustrated, if a sub-network is associated with each permutation combination, each generator supplies, in nominal condition and with all of the generators being operational and declared available, a sub-network of each ring permutator, therefore six sub-networks in all.

The generator that supplies a sub-network under these nominal conditions is called a legitimate generator of the sub-network.

The process is illustrated in the synoptic view of FIG. 3.

The legitimate generators are assigned in a preliminary step 100 of design of the electric distribution system to obtain the desired balancing.

During the use of the electric distribution system, the initial conditions for distributing the loads can be disrupted to the point that the network finds itself imbalanced at a level that is incompatible with the desired balancing objectives.

Such a loss of balance can be caused in particular by a change in the consumption of certain loads that can be variable, the connection or the disconnection of certain loads, the stopping or the starting of a generator, a change in the choice of the optimal distribution of the loads, for example over a given period such as a particular flight phase of an aircraft.

The events such as connection, disconnection, stopping or starting can be the consequence of commands in normal or abnormal situations or else the consequence of unforeseen events, breakdowns in particular.

In a first step 110 of the balancing process, the parameters are determined that characterize the available power margin for each of the generators and for the electric distribution system:

Wmaxnetwork=the sum of the maximum powers WmaxGi that can be delivered by each of the operational generators Gi WGi=the actual power delivered by the generator Gi for each generator, from which is deduced the relative load WGi % of the generator Gi, with WGi %=100×WGi/WmaxGi WrGi=the actual relative power delivered by the generator Gi in the network in relation to the total power distributed in the network, that is to say WrGi=WGi/Wmaxnetwork It should be recalled that WmaxGi cannot be a constant value in all circumstances.

In particular, different values WmaxGi can be assigned to the generator Gi as a function of methods of use, for example: continuous use or limited duration use, all the generators in operation or certain generators broken down . . . .

For a generator Gi that is incapable of delivering the electric power, we will have WmaxGi=0.

In practice, the value WGi of the actual power delivered by a generator Gi can be obtained from signals delivered by sensors, for example voltage and current sensors at the output of the generator, or can be estimated as a function of the loads connected to the sub-networks supplied by said generator Gi, which loads and their powers absorbed, can be known or at the very least estimated by, for example, a system for managing the electrical loads as in the case of a modern aircraft that uses circuit breakers that are monitored on the electric lines.

In a second step 120, a new theoretical balancing power WneGi is calculated for each of the operational generators.

The sum of the new theoretical balancing powers for all of the operational generators corresponds, by necessity to continue to supply the loads of the network, to the sum of the actual powers delivered by all of the operational generators:

Sum (WneGi)=sum (WGi) for the operational generators.

Advantageously, the distribution of power between the operational generators is maintained with the same ratios as in the initial distribution of the generators under consideration, that is to say that for each operational generator Gi:

WneGi/sum (WneGi)=WteGi/sum (WteGi), considering only the operational generators.

However, this condition that has the advantage of being equitable while respecting the initial load distribution is not imperative and can be changed as a function of other criteria, such as safety criteria that must be applied to a particular generator.

Regardless of the method selected to calculate the values of WneGi, the latter correspond to an improvement of the balance of the network in relation to the actual situation that has just been determined and that justifies a rebalancing of the network.

A power variance DWi is then established for each operational generator Gi, the difference between the actual power WGi and the new theoretical balancing power WneGi:

$$DWi = WGi - WneGi$$

When the actual power delivered by the generator Gi is greater than the new theoretical balancing power WneGi, DWi is positive and the generator Gi is considered to be in positive imbalance.

This case arises, for example, in a situation where a load increases on a sub-network supplied by the generator under consideration, for example following the taking over by the generator of a sub-network previously supplied by another generator, for example following a breakdown.

When the actual power delivered by the generator Gi is lower than the new theoretical balancing power WneGi, DWi is negative and the generator Gi is considered to be in negative imbalance.

This case arises, for example, following the disconnection of loads of a sub-network supplied by said generator.

In a third step 130, sub-networks supplied by generators in positive imbalance that can be reassigned to generators in negative imbalance by the ring permutators receiving commands from a monitoring and command system are determined.

For this purpose, it is determined in which ring permutators:

on the one hand, an operational generator in negative imbalance is actually declared unavailable, having as a consequence that the sub-network of which it is the legitimate generator has been transferred to another generator, called heir generator, following it in the combination associated with said sub-network. These permutators are called first category ring permutators;

on the other hand, a generator in positive imbalance and effectively supplying a sub-network is followed effectively in the order of permutation of the combination of said permutator by a generator in negative imbalance. These permutators are called second category ring permutators.

Here, it involves the generator effectively following on the operational plan, that is to say without taking into consideration in the ring permutator under consideration a possible generator that would have been declared unavailable in said ring permutator even if the latter appears between the generators in positive and negative imbalance in the permutation sequence that characterizes the permutation ring.

In a fourth step 140, the ring permutators are actuated so that:

at first, in the ring permutators of the first category, the sub-networks having been previously transferred by their legitimate generators to an heir generator are again supplied by their respective legitimate generators, which is achieved by declaring, at the level of said ring permutator, the generator in negative imbalance again available;

secondly, if the network is still not balanced, in the ring permutators of the second category, the sub-networks are transferred from the generator in positive imbalance to the generator in negative imbalance, which is achieved by declaring, at the level of said ring permutator, the generator in positive imbalance unavailable.

This fourth step can be achieved overall if the data necessary to achieve the rebalancing of the network are available, for example when the powers absorbed by each sub-network are known, which makes it possible to establish a list of permutations that are sufficient and necessary to balance the network.

In another method of using the process, a single declaration, or a limited number of declarations, of a generator that is available or unavailable is/are made at the same time, and a new rebalancing cycle is performed from the step 110 until a balancing that is judged satisfactory is attained.

It should be noted that a balance of the network cannot in practice be perfect and that a moderate imbalance of the network is without practical consequence.

The switches of sub-networks in fact make it possible only to approach the desired theoretical balance since it is not possible to divide a sub-network and the choice of the switchings among all of the permutations making it possible to improve the balancing of the network in relation to the actual situation is advantageously the one making it possible to obtain a distribution of the powers by the generator the closest possible to that of the theoretical balancing on the basis of an optimization criterion, for example a criterion of the least error squares.

To avoid irrelevant actions on the ring permutators, the triggering of an effective rebalancing is done at the end of the second step 120 from criteria taken in isolation or in combination such as:

exceeding a pre-determined provided actual power threshold of a generator;

exceeding a threshold of variances of the actual powers provided by the generators;

time elapsed since the finding of an imbalance;

time elapsed since the preceding rebalancing . . . .

If none of the criteria retained lead to envisaging a rebalancing, the process is taken back to the first step 110, preferably with a time-lag.

In this process, the distribution of the power delivered by a generator on several sub-networks, which can be switched individually by the ring permutators from a legitimate generator or an heir generator to another generator, makes it possible to modulate the power demanded at each generator.

In the illustrated example having 24 sub-networks supplied by six ring permutators, any generator is followed by another given generator in the order of the combination of a ring permutator in two of the six ring permutators.

However, the number of ring permutators is not limited to six, and one type of ring permutator can be present two or more times in the network, which makes it possible to multiply the number of sub-networks and increases the number of possibilities to achieve the rebalancing of the network.

For example, in a distribution system comprising two times each ring permutator model, it is possible to make a network with 48 sub-networks, an arrangement that considerably increases the possibilities of rebalancing the network.

The invention claimed is:

1. Process for balancing an electric distribution system comprising an electric network, said network being divided into sub-networks, comprising N generators, N greater than or equal to three, each generator supplying a part of the network when said generator is operational, in which network each sub-network is supplied at a given moment by only one generator, in which network each sub-network is associated, by a ring permutator (1) to which it is connected, with a combination of P generators that define an order of connection, among the possible connections, of said sub-network to at least three—P being greater than or equal to three—of the generators among the N generators and in which balancing process:

in a first step (110) are determined:
Wmaxnetwork: the maximum power available on the network, equal to the sum of the maximum powers WmaxGi that can be delivered by each of the operational generators Gi;
for each operational generator Gi the actual power delivered WGi;

in a second step (120) are calculated for each of the operational generators:
a new theoretical power for balancing WneGi that takes into account desired conditions for distribution of the loads and such that sum (WneGi)=sum (WGi) of the operational generators Gi, and;

a power variance $DWi=WGi-WneGi$ between the actual power and the new theoretical power for balancing;

in a third step (130) are identified the sub-networks supplied by generators in positive imbalance, i.e., whose power variance DWi is positive, and that can be reassigned by a ring permutator (1) to a generator in negative imbalance, i.e., whose power variance DWi is negative;

in a fourth step (140), ring permutators (1) connected to the sub-networks identified during the preceding step (130) are actuated to supply all or part of said sub-networks by generators in negative imbalance.

2. Process according to claim 1, in which during the third step (130), identified among the ring permutators (1) are:

those of a first category that comprise an operational generator in negative imbalance and declared unavailable in the ring permutator;

those of a second category that comprise a generator in positive imbalance and effectively supplying a sub-network that is effectively followed in the permutation order of their combinations by a generator in negative imbalance.

3. Process according to claim 2, in which during the fourth step (140), the balancing of the network is achieved firstly by action on the ring permutators of the first category.

4. Process according to claim 1, in which the third and fourth steps (130, 140) are performed only when at least one power variance DWi exceeds a threshold value.

5. Process according to claim 1, in which the third and fourth steps (130, 140) are performed only if a predetermined time has passed since a prior execution of said third and fourth steps.

6. Process according to claim 2, in which the third and fourth steps (130, 140) are performed only when at least one power variance DWi exceeds a threshold value.

7. Process according to claim 2, in which the third and fourth steps (130, 140) are performed only if a predetermined time has passed since a prior execution of said third and fourth steps.

8. Process according to claim 3, in which the third and fourth steps (130, 140) are performed only when at least one power variance DWi exceeds a threshold value.

9. Process according to claim 3, in which the third and fourth steps (130, 140) are performed only if a predetermined time has passed since a prior execution of said third and fourth steps.

10. Process according to claim 4, in which the third and fourth steps (130, 140) are performed only if a predetermined time has passed since a prior execution of said third and fourth steps.

* * * * *